United States Patent [19]

Bellande et al.

[11] 4,159,228

[45] Jun. 26, 1979

[54] APPARATUS FOR SOLAR DISTILLATION

[75] Inventors: Rudolph H. Bellande, Spring Valley; Donald C. Wilson, La Mesa, both of Calif.

[73] Assignee: Avant, Ltd., San Diego, Calif.

[21] Appl. No.: 840,823

[22] Filed: Oct. 11, 1977

[51] Int. Cl.² .......................... B01D 3/00; F24J 3/02; C02B 1/04
[52] U.S. Cl. .............................. 202/185 B; 202/234; 203/10; 203/49; 203/DIG. 1
[58] Field of Search .................. 203/DIG. 17, 10, 11, 203/100, 49, DIG. 1; 202/234, 185 B; 159/15, 15 F; 126/271

[56] References Cited

U.S. PATENT DOCUMENTS

| | | | |
|---|---|---|---|
| 983,424 | 2/1911 | Brosius | 203/DIG. 1 |
| 1,544,029 | 6/1925 | Nelson | 203/DIG. 1 |
| 2,202,019 | 5/1940 | Mohr | 203/DIG. 1 |
| 2,405,877 | 8/1946 | Delano | 203/DIG. 1 |
| 3,414,481 | 12/1968 | Kelly | 203/DIG. 1 |
| 3,655,517 | 4/1972 | Hensley et al. | 203/DIG. 1 |
| 3,986,936 | 10/1976 | Rush | 203/DIG. 1 |

Primary Examiner—Wilbur L. Bascomb, Jr.
Attorney, Agent, or Firm—John L. Haller

[57] ABSTRACT

An apparatus for the solar distillation of contaminated water which includes a substantially airtight enclosure having an evaporation chamber and condensation chamber. The evaporation chamber has a lower reservoir and an upper inclined surface which is transparent to solar radiation. The condensation chamber includes a thermally conductive condensation wall and a collecting reservoir for collecting the condensed water. A thermal insulative partition is located intermediate the evaporation chamber and the condensation chamber, and includes an upper port and a lower port. At least one thermally conductive conduit may be located within the condensation chamber and externally vented at the upper and lower portions thereof.

5 Claims, 2 Drawing Figures

APPARATUS FOR SOLAR DISTILLATION

BACKGROUND OF THE INVENTION

1. Field of the Invention

This invention relates to an improved apparatus for the distillation of contaminated water. Conventional distillation apparatuses use solar energy to evaporate contaminated water within the apparatuses, to form warm humid air. The moisture within the warm humid air is subsequently condensed and collected.

2. Brief Description of the Prior Art

Conventional distillation devices which employ solar radiation to evaporate contaminated water generally include a chamber having a contaminated water reservoir and a solar transparent screen whereby solar energy is admitted into the chamber, raising the temperature thereof and evaporating the contaminated water therein to form warm humid air. Numerous devices have been developed which promote this evaporation process.

For example, U.S. Pat. No. 102,633 discloses a device which includes a plurality of horizontal troughs oriented to expose the contaminated water therein to maximum exposure of the solar radiation. U.S. Pat. No. 1,812,516 discloses a device which has a plurality of capillary strips or wicks that continually supply a thin film of contaminated water to a sheet which is oriented for maximum exposure to the radiant heat. U.S. Pat. No. 3,104,210 described a device which consists of a plurality of absorbent wicks that draw water onto a sheet where it receives maximum exposure to the radiant energy. U.S. Pat. No. 3,159,554 described a device which employs a spongy, black, absorbent mat adapted to be moistened with the contaminated water and which is subjected to the direct rays of the sun.

While a number of prior art devices are designed to promote the evaporation of the contaminated water, the applicant knows of no solar distillation devices which define a structure intended to promote the condensation of water.

SUMMARY OF THE INVENTION

This invention relates to a new and unique apparatus for the solar distillation of contaminated water. The apparatus comprises a substantially airtight enclosure having an evaporation chamber, a condensation chamber, and a thermal insulative partition. The unique construction of the present invention substantially increases the circulation of air between the evaporation chamber and the condensation chamber, thereby increasing the efficiency of the distillation process.

The evaporation chamber includes a lower reservoir and an inclined upper surface which is transparent to solar radiation. The condensation chamber includes a thermally conductive condensation wall and a collecting reservoir. The insulative partition, positioned intermediate the evaporation chamber and the condensation chamber, includes an upper port and a lower port enabling the circulation of air between the evaporation chamber and the condensation chamber to take place.

An object of this invention is to provide an improved apparatus for solar distillation. A further object of this invention is to provide a device which demonstrates substantially increased efficiency of the distillation process. A further object of this invention is to provide an apparatus which increases air circulation within the apparatus. A further object of this invention is to provide an improved apparatus which includes an evaporation chamber, a condensation chamber and an insulative partition intermediate the condensation chamber and the evaporation chamber.

BRIEF DESCRIPTION OF THE DRAWINGS

The following is a brief description of the accompanying drawings.

DESCRIPTION OF THE PREFERRED EMBODIMENT

Figure 1:
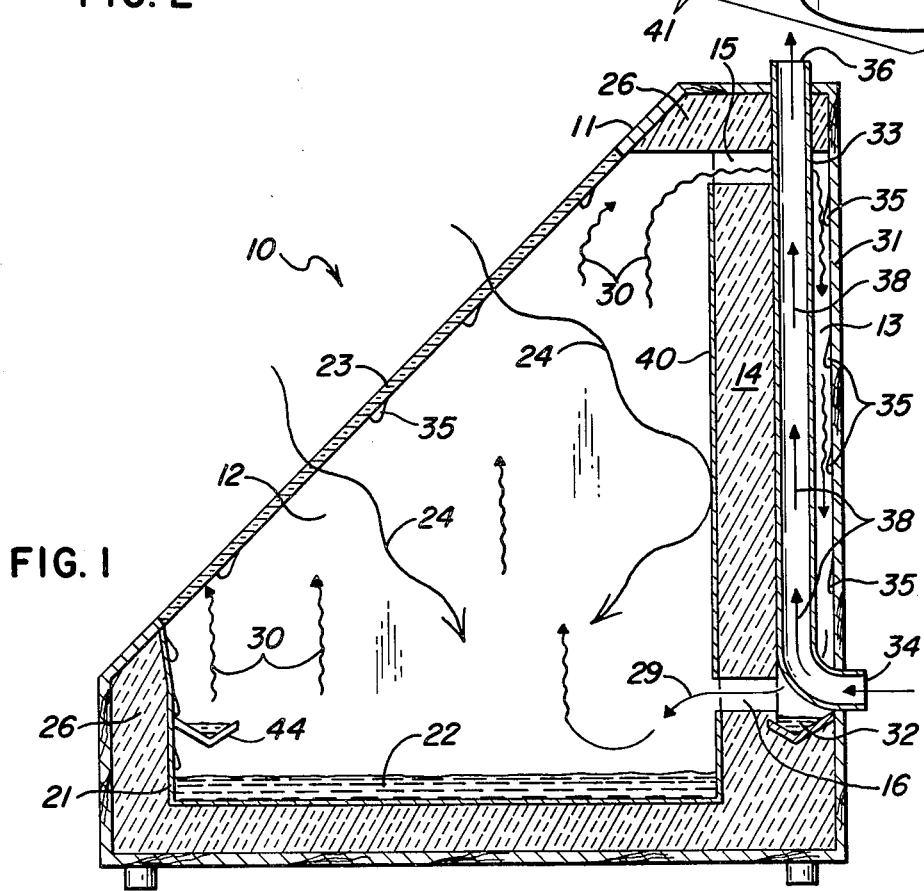
FIG. 1 is a view in cross section of the improved solar distillation apparatus.

FIG. 1 of the drawings shows a cross sectional view of the improved solar distillation apparatus 10. The distillation apparatus includes a substantially airtight enclosure 11 having an evaporation chamber 12 and a condensation chamber 13. The evaporation chamber 12 and the condensation chamber 13 are separated by an insulative partition 14 with an upper port 15 and a lower port 16.

The evaporation chamber 11 includes a lower reservoir 21 adapted to hold contaminated water 22 and an upper inclined surface 23 which is transparent to the solar radiation, symbolically shown at 24. The evaporation chamber is thermally insulated from the external environment by thermal insulation 26 to prevent the escape of heat energy within the evaporation chamber 12. The lower reservoir 21 is watertight to prevent the leakage of the contaminated water 22.

The inclined upper surface 23 is oriented for maximum exposure to the solar radiation 24. The solar radiation 24 penetrates the inclined upper surface 23 of the evaporation chamber 12 and increases the temperature therein. The increased temperature causes the contaminated water 22 to evaporate, producing warm humid air, symbolically shown at 30. The warm humid air 30 rises within the evaporation chamber 12, entering the condensation chamber 13 through the upper port 15 in the insulative partition 14. The upper port 15 and the lower port 16 may be either a slot opening as shown or a plurality of venting openings.

The condensation chamber 13 includes a thermally conductive condensation wall 31 and a collecting reservoir 32. The condensation chamber 13, being insulated from the evaporation chamber 12 and shaded from the solar radiation 24, experiences an internal temperature cooler than that of the evaporation chamber 12. The warm humid air 30 entering the top of the condensation chamber 13 being exposed to the lower temperature within the condensation chamber 13, is cooled causing the condensation of moisture 35 within the warm humid air 30 on the condensation wall 31 and forming cool dry air, symbolically shown at 29. The condensed moisture 35 is collected in the collection reservoirs 32.

The condensation chamber 13 operates as a reverse chimney whereby warm humid air 30 enters the top of the condensation chamber 13 through the upper port 15 in the insulated partition 14 and is cooled thereby condensing the moisture 35 onto condensation wall 31 forming cool dry air 29 which falls within the condensation chamber 13 and enters the evaporation chamber 12 through the lower port 16 in the insulative wall 14.

The condensation chamber 13 is further provided with at least one thermally conductive conduit 33 which is vented to the ambient atmosphere at the lower end 34 and the upper end 36. The conduit 33 absorbs heat from the warm humid air 30 transferring it to the air 38 therein.

The warmed air 38 within the conduit 33 is allowed to rise and exit the upper end 36, drawing cooler ambient air in through the lower end 34. The conduit 33 thus functions to promote the condensation of moisture within the warm humid air 30.

The improved distillation apparatus 10 establishes an internal air circulation of warm, humid air 30 from the evaporation chamber 12 into the condensation chamber 13 where it is cooled causing the condensing moisture 35 therefrom forming dry cooled air 29 which falls within the condensation chamber 13 and enters the evaporation chamber 12 where it is again heated. This internal circulation of warm humid air 30 to cool dry air 29 increases the efficiency of the distillation apparatus.

A variation of the preferred embodiment of the Improved Distillation Apparatus 10 includes a reflecting surface 40 mounted to the inside walls of the evaporation chamber 12 whereby the contaminated water 22 may be exposed to and receive more of the solar radiation 24. The Improved Distillation Apparatus 10 may also include a forward reservoir 44 whereby moisture which condenses on the inclined upper surface 23, in a conventional manner, may be collected.

Figure 2:
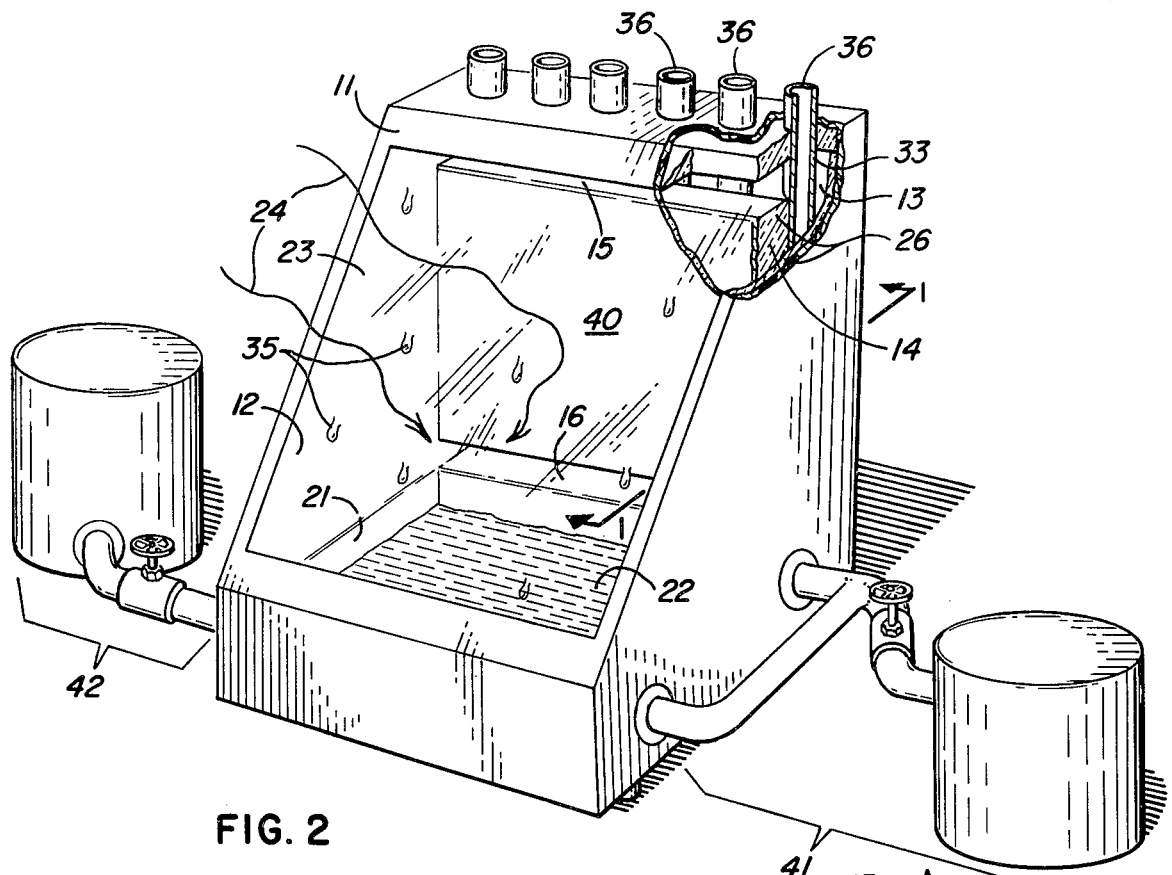
FIG. 2 is an oblique view of the improved solar distillation apparatus in operation.

FIG. 2 shows a perspective view of the distillation apparatus 10 in operation. The inclined upper surface 23 is directed towards maximum exposure of solar radiation 24 thereby shading the condensation chamber 13. Conventional means 42 are provided to automatically refill the lower reservoir 21 with the contaminated water 22 and the collected condensed water is removed from the collection reservoir 32 and the forward reservoir 44 through conventional removal and storage means 41.

While variations of this concept could easily be developed, the precise structure described above is considered best for the fabrication of the improved solar distillation apparatus. Using the above description, those skilled in the particular art could easily construct this or variant forms of the improved art. Such variant forms are to be considered within the scope and essence of this invention.

What is claimed is:

1. An improved apparatus for the distillation of contaminated water comprising; a substantially airtight enclosure having an evaporation chamber, a condensation chamber, and an insulative partition intermediate said evaporation chamber and said condensation chamber, said enclosure being adapted to operate in an outside environment and positioned so that the condensation chamber is shaded from direct solar radiation, said evaporation chamber having a lower reservoir adapted for containing contaminated water and an inclined upper surface transparent to solar radiation, said condensation chamber having a thermally conductive condensation wall and a collecting reservoir adapted for collecting condensed water, and said insulative partition having an upper port connecting the upper portion of said evaporation chamber with the upper portion of said condensation chamber, and a lower port connecting the lower portion of said evaporation chamber with the lower portion of said condensation chamber, said condensation chamber having a reverse chimney means, said condensation chamber having at least one thermally conductive conduit having a lower end vented to the atmosphere at the lower portion of said condensation chamber and an upper end vented to the atmosphere at the upper portion of said condensation chamber.

2. An improved apparatus for the distillation of contaminated water, as recited in claim 1, which further includes: a means for maintaining contaminated water within the lower reservoir of the evaporation chamber and a means for withdrawing condensed water from the collecting reservoir within the condensation chamber.

3. An apparatus for the distillation of contaminated water, as recited in claim 1, which further includes a reflecting surface mounted to the inside walls of said evaporation chamber.

4. An improved apparatus for the distillation of evaporated water, as recited in claim 1, which further includes a forward reservoir mounted to the inside of said evaporation chamber so that said forward reservoir collects the water moisture which condenses on the inclined upper surface of said evaporation chamber.

5. An apparatus for the distillation of contaminated water which comprises: a substantially airtight enclosure having an evaporation chamber, said evaporation chamber having a lower reservoir adapted for holding contaminated water and an inclined upper surface which is transparent to solar radiation, said evaporation chamber adapted to permit solar radiation to enter the evaporation chamber whereby it raises the temperature therein, said increased temperature causing the evaporation of water moisture within said contaminated water whereby to form warm humid air which rises within said evaporation chamber, a condensation chamber, said condensation chamber having a thermally conductive condensation wall and a collecting reservoir, said condensation chamber adapted for accepting warm humid air at the upper portion thereof and condensing the moisture therefrom onto the condensation wall by exposing the warm humid air to a thermally cooler temperature, said condensation of warm humid air forming cool dry air which falls within said condensation chamber and wherein said condensation chamber includes a reverse chimney means, said condensation chamber including at least one thermally conductive conduit having a lower end vented to the atmosphere at the lower portion of said condensation chamber and an upper end vented to the atmosphere at the upper portion of said condensation chamber, and an insulative partition intermediate said evaporation chamber and said condensation chamber, said insulative partition having an upper port adapted for conducting warm humid air from the upper portion of the evaporation chamber into the upper portion of the condensation chamber, and a lower port adapted for conducting cool dry air from the lower portion of the condensation chamber into the lower portion of the evaporation chamber.

* * * * *